United States Patent
Li et al.

(10) Patent No.: US 10,339,091 B2
(45) Date of Patent: Jul. 2, 2019

(54) PACKET DATA PROCESSING METHOD, APPARATUS, AND SYSTEM

(71) Applicant: Huawei Technologies Co., Ltd., Shenzhen (CN)

(72) Inventors: Junying Li, Shenzhen (CN); Rui Tan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 15/344,972

(22) Filed: Nov. 7, 2016

(65) Prior Publication Data

US 2017/0052925 A1 Feb. 23, 2017

Related U.S. Application Data

(63) Continuation of application No. PCT/CN2014/088585, filed on Oct. 14, 2014.

(30) Foreign Application Priority Data

May 8, 2014 (CN) .......................... 2014 1 0193733

(51) Int. Cl.
*G06F 13/42* (2006.01)
*G06F 13/36* (2006.01)
*G06F 13/38* (2006.01)

(52) U.S. Cl.
CPC .......... *G06F 13/4282* (2013.01); *G06F 13/36* (2013.01); *G06F 13/385* (2013.01)

(58) Field of Classification Search
CPC ..... G06F 13/4282; G06F 13/36; G06F 13/385
See application file for complete search history.

(56) References Cited

U.S. PATENT DOCUMENTS 7,764,676 B1* 7/2010 Dickman .............. G06F 13/385
                                                           370/389
2006/0209718 A1* 9/2006 Kinsey ................ G06F 9/45558
                                                           370/254

(Continued)

FOREIGN PATENT DOCUMENTS

CA       2313462 A1    6/1999
CN    101159729 A     4/2008

(Continued)

OTHER PUBLICATIONS

Machine Translation and Abstract of Chinese Publication No. CN103973581, Part 1, Aug. 6, 2014, 8 pages.

(Continued)

*Primary Examiner* — Tim T Vo
*Assistant Examiner* — Harry Z Wang
(74) *Attorney, Agent, or Firm* — Conley Rose, P.C.

(57) ABSTRACT

A packet data processing method, apparatus, and system. The method is executed by a first processing apparatus, and includes: acquiring packet data that needs to be processed, where the packet data that needs to be processed includes first packet data information and second packet data, and the first packet data information includes a header of the packet data that needs to be processed and a storage address of the packet data that needs to be processed in the first processing apparatus; sending the first packet data information to a second processing apparatus; and receiving first packet data information (includes an updated header after being processed and the storage address) processed by the second processing apparatus, and generating finished packet data using the first packet data information processed by the second processing apparatus and the second packet data.

17 Claims, 5 Drawing Sheets

(56) References Cited

U.S. PATENT DOCUMENTS

2011/0170478 A1\* 7/2011 Estrada .................. G06F 9/545
                                                                               370/328
2011/0268119 A1\* 11/2011 Pong ...................... H04L 47/32
                                                                               370/392

FOREIGN PATENT DOCUMENTS

| CN | 102104541 A | 6/2011 |
| CN | 103973581 A | 8/2014 |
| KR | 1020080051022 A | 6/2008 |
| WO | 9804096 A1 | 1/1998 |

OTHER PUBLICATIONS

Machine Translation and Abstract of Chinese Publication No. CN103973581, Part 2, Aug. 6, 2014, 4 pages.
Foreign Communication From a Counterpart Application, European Application No. 14891136.5, Extended European Search Report dated Mar. 29, 2017, 7 pages.
Foreign Communication From a Counterpart Application, PCT Application No. PCT/CN2014/088585, English Translation of International Search Report dated Jan. 26, 2015, 3 pages.
Foreign Communication From a Counterpart Application, PCT Application No. PCT/CN2014/088585, English Translation of Written Opinion dated Jan. 26, 2015, 6 pages.

\* cited by examiner

PACKET DATA PROCESSING METHOD, APPARATUS, AND SYSTEM

CROSS-REFERENCE TO RELATED APPLICATIONS

This application is a continuation of International Application No. PCT/CN2014/088585, filed on Oct. 14, 2014, which claims priority to Chinese Patent Application No. 201410193733.1, filed on May 8, 2014, both of which are hereby incorporated by reference in their entireties.

TECHNICAL FIELD

The present disclosure relates to the field of communications technologies, and in particular, to a packet data processing method, apparatus, and system.

BACKGROUND

With rapid development of Internet technologies, users raise higher requirements on network data processing performance of a Central Processing Unit (CPU).

A series of CPUs based on an Intel® X86 platform (X86 CPU) are general purpose central processing units. Because the X86 CPU lacks a corresponding hardware acceleration engine when performing some data operations or processing related to a network function, processing performance of an entire system is not high. In order to solve this problem, generally some coprocessor chips are added to a periphery of the X86 CPU, and work related to network data processing is transplanted into the coprocessor chips for implementation. Packet data transmission between these coprocessor chips and the X86 CPU is generally implemented using a peripheral component interconnect express (PCIe) link.

For example, after receiving packet data from a network side, a coprocessor chip sends the packet data to an X86 CPU through a PCIe link for processing. After completing processing on the packet data, the X86 CPU sends processed packet data back to the coprocessor chip through a PCIe link. Finally the coprocessor chip sends the processed packet data to the network side for output. In actual application, data transmission may also be performed multiple times between the coprocessor chip and the X86 CPU through a PCIe link.

During the foregoing data processing, transmission of packet data between the X86 CPU and the coprocessor chip through the PCIe link imposes a high requirement on bandwidth of the PCIe link; however, because a PCIe bus is a bus protocol of a control type, packet data transmission efficiency is not high.

SUMMARY

In view of this, embodiments of the present disclosure provide a packet data processing method, apparatus, and system so as to improve packet data transmission efficiency.

To achieve the foregoing objective, the following technical solutions are adopted in the embodiments of the present disclosure:

According to a first aspect, the present disclosure provides a packet data processing method, where the method is executed by a first processing apparatus, and includes: acquiring packet data that needs to be processed, where the packet data that needs to be processed includes first packet data information and second packet data, and the first packet data information includes a header of the packet data that needs to be processed and a storage address of the packet data that needs to be processed in the first processing apparatus; sending the first packet data information to a second processing apparatus so that the second processing apparatus processes the first packet data information; and receiving first packet data information processed by the second processing apparatus, and generating finished packet data using the first packet data information processed by the second processing apparatus and the second packet data indicated by the storage address, where the first packet data information processed by the second processing apparatus includes an updated header processed by the second processing apparatus and the storage address.

In a first possible implementation manner of the first aspect, the first processing apparatus communicates with the second processing apparatus using Peripheral Component Interconnect Express.

With reference to the first aspect or the first possible implementation manner of the first aspect, in a second possible implementation manner of the first aspect, the generating finished packet data using the first packet data information processed by the second processing apparatus and the second packet data indicated by the storage address includes: acquiring the second packet data using the storage address; and associating the updated header with the second packet data to generate the finished packet data.

With reference to the first aspect or either of the first and the second possible implementation manners of the first aspect, in a third possible implementation manner of the first aspect, the first processing apparatus is a central processing unit, and the second processing apparatus is a coprocessor; or the first processing apparatus is a coprocessor, and the second processing apparatus is a central processing unit.

According to a second aspect, the present disclosure provides a packet data processing method, where the method is executed by a second processing apparatus, and includes: receiving first packet data information, sent by a first processing apparatus, in packet data that needs to be processed, where the first packet data information includes a header of the packet data that needs to be processed and a storage address of the packet data that needs to be processed in the first processing apparatus; processing the header of the packet data that needs to be processed to obtain an updated header; and sending processed first packet data information to the first processing apparatus so that the first processing apparatus generates finished packet data according to the processed first packet data information and second packet data in the packet data that needs to be processed, where the processed first packet data information includes the updated header and the storage address.

In a first possible implementation manner of the second aspect, the first processing apparatus communicates with the second processing apparatus using Peripheral Component Interconnect Express.

With reference to the second aspect or the first possible implementation manner of the second aspect, in a second possible implementation manner of the second aspect, the first processing apparatus is a central processing unit, and the second processing apparatus is a coprocessor; or the first processing apparatus is a coprocessor, and the second processing apparatus is a central processing unit.

According to a third aspect, the present disclosure provides a packet data processing apparatus, where the packet data processing apparatus is located in a first processing apparatus, and includes: an acquiring unit configured to acquire packet data that needs to be processed, where the packet data that needs to be processed includes first packet data information and second packet data, and the first packet data information includes a header of the packet data that needs to be processed and a storage address of the packet data that needs to be processed in the first processing apparatus; a sending unit configured to send the first packet data information acquired by the acquiring unit to a second processing apparatus so that the second processing apparatus processes the first packet data information; and a first processing unit configured to: receive first packet data information processed by the second processing apparatus, and generate finished packet data using the first packet data information processed by the second processing apparatus and the second packet data indicated by the storage address, where the first packet data information processed by the second processing apparatus includes an updated header and the storage address.

In a first possible implementation manner of the third aspect, the first processing apparatus communicates with the second processing apparatus using Peripheral Component Interconnect Express.

With reference to the third aspect or the first possible implementation manner of the third aspect, in a second possible implementation manner of the third aspect, the first processing unit includes: an acquiring module configured to acquire the second packet data using the storage address; and a processing module configured to associate the updated header with the second packet data acquired by the acquiring module to generate the finished packet data.

With reference to the third aspect or either of the first and the second possible implementation manners of the third aspect, in a third possible implementation manner of the third aspect, the first processing apparatus is a central processing unit, and the second processing apparatus is a coprocessor; or the first processing apparatus is a coprocessor, and the second processing apparatus is a central processing unit.

According to a fourth aspect, the present disclosure provides a packet data processing apparatus, where the packet data processing apparatus is located in a second processing apparatus, and includes: a receiving unit configured to receive first packet data information, sent by a first processing apparatus, in packet data that needs to be processed, where the first packet data information includes a header of the packet data that needs to be processed and a storage address of the packet data that needs to be processed in the first processing apparatus; a second processing unit configured to process the header, received by the receiving unit, of the packet data that needs to be processed to obtain an updated header; and a sending unit configured to send first packet data information processed by the second processing unit to the first processing apparatus so that the first processing apparatus generates finished packet data according to the processed first packet data information and second packet data in the packet data that needs to be processed, where the processed first packet data information includes the updated header and the storage address.

In a first possible implementation manner of the fourth aspect, the first processing apparatus communicates with the second processing apparatus using Peripheral Component Interconnect Express.

With reference to the fourth aspect or the first possible implementation manner of the fourth aspect, in a second possible implementation manner of the fourth aspect, the first processing apparatus is a central processing unit, and the second processing apparatus is a coprocessor; or the first processing apparatus is a coprocessor, and the second processing apparatus is a central processing unit.

According to a fifth aspect, the present disclosure provides a packet data processing system, including a first processing apparatus and a second processing apparatus, where the first processing apparatus is configured to: acquire packet data that needs to be processed, where the packet data that needs to be processed includes first packet data information and second packet data, and the first packet data information includes a header of the packet data that needs to be processed and a storage address of the packet data that needs to be processed in the first processing apparatus; and send the first packet data information to the second processing apparatus; and the second processing apparatus is configured to: receive the first packet data information sent by the first processing apparatus; process the header of the packet data that needs to be processed to obtain an updated header; and send processed first packet data information to the first processing apparatus so that the first processing apparatus generates finished packet data according to the processed first packet data information and the second packet data in the packet data that needs to be processed, where the processed first packet data information includes the updated header and the storage address.

According to the packet data processing method, apparatus, and system provided in the embodiments of the present disclosure, when packet data is being processed, only first packet data information in a first processing apparatus is sent to a second processing apparatus for processing; that is, only some necessary data is sent to the second processing apparatus for processing, and data that does not need to be processed may be stored in the first processing apparatus. The data stored in the first processing apparatus does not need to be transmitted through a PCIe link, which helps alleviate a burden of the PCIe link. Therefore, compared with the prior art, the packet data processing method, apparatus, and system provided in the embodiments of the present disclosure can improve packet data transmission efficiency of packet data.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
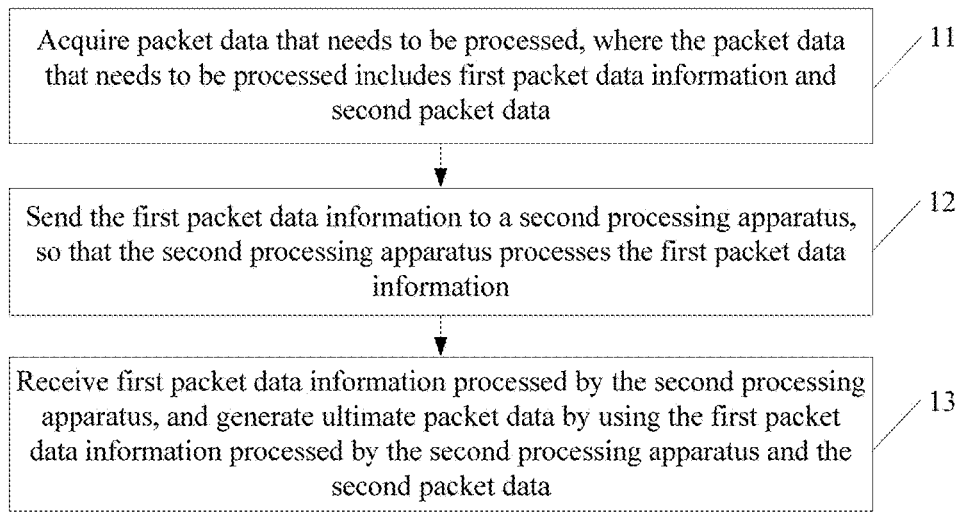
FIG. 1 is a flowchart of a packet data processing method according to Embodiment 1 of the present disclosure.

To improve packet data transmission efficiency, as shown in FIG. 1, Embodiment 1 of the present disclosure provides a packet data processing method, where the method is executed by a first processing apparatus, and includes the following steps:

Step 11: Acquire packet data that needs to be processed, where the packet data that needs to be processed includes first packet data information and second packet data, and the first packet data information includes a header of the packet data that needs to be processed and a storage address of the packet data that needs to be processed in the first processing apparatus.

The first processing apparatus may be an apparatus that can process packet data, such as a CPU or a coprocessor chip. For example, the CPU may be a CPU of an X86 system, or may be application (APP) software, virtual machine (VM) software, or the like in an X86 CPU in specific application; the coprocessor chip may be an intelligent network interface card chip.

A header of the packet data in the first packet data information is packet data that really needs to be processed in the packet data that needs to be processed. The header of the packet data may include information, such as a packet type, a packet version, a packet length, and a destination address and source address of a packet.

The second packet data is packet data that does not need to be sent to a second processing apparatus for processing, that is, packet data, except the first packet data information, in the packet data that needs to be processed. In actual application, this part of packet data may reside in the first processing apparatus.

Step 12: Send the first packet data information to a second processing apparatus so that the second processing apparatus processes the first packet data information.

The second processing apparatus may be a processing apparatus that communicates with the first processing apparatus. If the first processing apparatus is an X86 CPU, the second processing apparatus is a coprocessor chip; if the first processing apparatus is a coprocessor chip, the second processing apparatus is an X86 CPU.

The first processing apparatus may send network packet data to the second processing apparatus through a PCIe link.

Step 13: Receive first packet data information processed by the second processing apparatus, and generate finished packet data using the first packet data information processed by the second processing apparatus and the second packet data indicated by the storage address, where the first packet data information processed by the second processing apparatus includes an updated header processed by the second processing apparatus and the storage address.

After the second processing apparatus processes the first packet data information in step 12, the processed packet data (the updated header) is then sent back to the first processing apparatus, second data residing in the first processing apparatus is acquired using the storage address, and the updated header is combined with the second data to generate the finished packet data, where the finished packet data may be output through a network interface, such as Ethernet.

It may be learned from the above that, according to the packet data processing method provided in Embodiment 1 of the present disclosure, when packet data is being processed, only first packet data information in a first processing apparatus is sent to a second processing apparatus for processing; that is, only some necessary data is sent to the second processing apparatus for processing, and data that does not need to be processed may be stored in the first processing apparatus. The data stored in the first processing apparatus does not need to be transmitted through a PCIe link, which helps alleviate a burden of the PCIe link. Therefore, compared with the prior art, the packet data processing method provided in Embodiment 1 of the present disclosure can improve packet data transmission efficiency.

Figure 2:
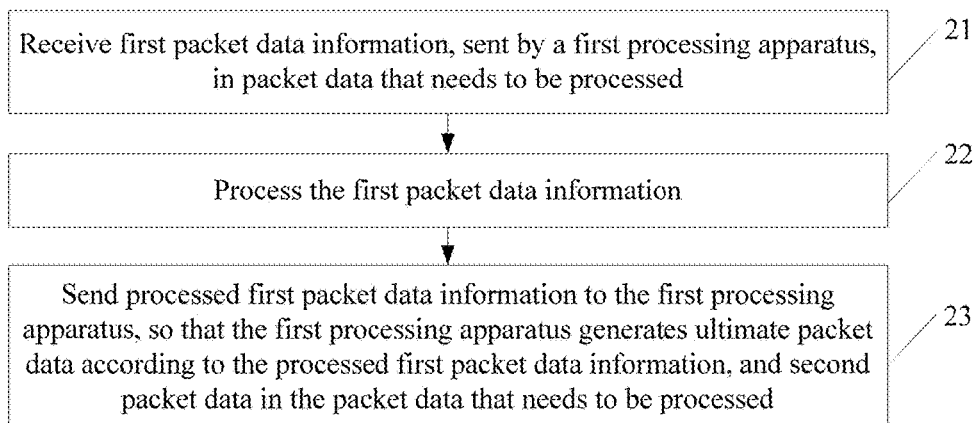
FIG. 2 is a flowchart of a packet data processing method according to Embodiment 2 of the present disclosure.

As shown in FIG. 2, Embodiment 2 of the present disclosure provides a packet data processing method, where the method is executed by a second processing apparatus, and includes the following steps:

Step 21: Receive first packet data information, sent by a first processing apparatus, in packet data that needs to be processed, where the first packet data information includes a header of the packet data that needs to be processed and a storage address of the packet data that needs to be processed in the first processing apparatus.

For the first processing apparatus, the second processing apparatus, and the first packet data information, reference may be made to description in Embodiment 1 of the present disclosure, and details are not described herein again. Therefore, according to the description in Embodiment 1 of the present disclosure, the first packet data information includes the header of the packet data that needs to be processed and the storage address of the packet data that needs to be processed in the first processing apparatus.

Step 22: Process the first packet data information. In actual application, this step comprises processing the header of the packet data that needs to be processed to generate an updated header, and generating processed first packet data information using the updated header.

various types of analysis processing, such as Ethernet protocol format analysis, and IP protocol format analysis may be performed on the header of the packet data that needs to be processed, and the updated header is generated after the processing. Then, the updated header and the storage address that is described in step 21 are used together as the processed first packet data information.

Step 23: Send processed first packet data information to the first processing apparatus so that the first processing apparatus generates finished packet data according to the processed first packet data information and second packet data in the packet data that needs to be processed.

The first processing apparatus may acquire, using the storage address of the packet data that needs to be processed in the first processing apparatus, original packet data that is in the first processing apparatus and not sent to the second processing apparatus; and then combine this part of data with the updated header that is generated in step 22 to generate the finished packet data.

It may be learned from the above that, according to the packet data processing method provided in Embodiment 2 of the present disclosure, when processing packet data, a second processing apparatus receives only some necessary packet data that is sent by a first processing apparatus through a PCIe link, and data that does not need to be processed may be stored in the first processing apparatus. The data stored in the first processing apparatus does not need to be transmitted through the PCIe link, which helps alleviate a burden of the PCIe link. Therefore, compared with the prior art, the packet data processing method provided in Embodiment 2 of the present disclosure can improve packet data transmission efficiency.

The following describes in detail a packet data processing method in the present disclosure using Embodiment 3 of the present disclosure. It is assumed that a first processing apparatus is a coprocessor, and a second processing apparatus is a central processing unit.

Figure 3:
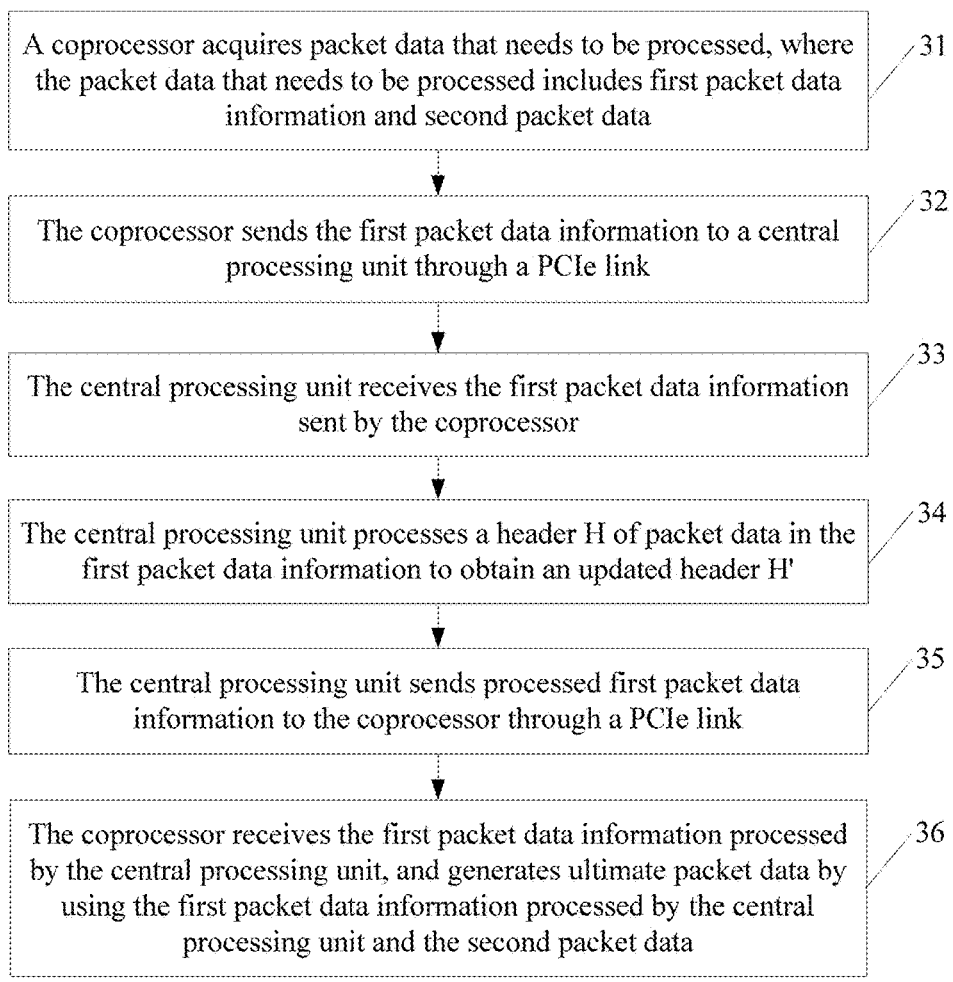
FIG. 3 is a flowchart of a packet data processing method according to Embodiment 3 of the present disclosure.

As shown in FIG. 3, the packet data processing method provided in Embodiment 3 of the present disclosure includes the following steps:

Step 31: The coprocessor acquires packet data that needs to be processed, where the packet data that needs to be processed includes first packet data information and second packet data.

For the first packet data information and the second packet data, reference may be made to description in Embodiment 1 or Embodiment 2 of the present disclosure. In addition to a header of the packet data that needs to be processed, the first packet data information further includes a storage address of the packet data that needs to be processed in the first processing apparatus.

For ease of description, it is assumed in the following description that the header of the packet data that needs to be processed is a Header (H), and the second packet data, which is a remaining part (that is, the second packet data) of the packet data that needs to be processed, is a Payload (P). The storage address of the packet data that needs to be processed in the coprocessor is an Address (A).

Step 32: The coprocessor sends the first packet data information to the central processing unit through a PCIe link. According to the foregoing assumption, this step is as follows: The coprocessor sends, to the central processing unit, both the header H of the packet data that needs to be processed and the storage address A in which the packet data that needs to be processed is stored in the coprocessor. However, the second packet data P resides in the coprocessor.

Step 33: The central processing unit receives the first packet data information sent by the coprocessor. That is, the central processing unit receives the header H of the packet data, and the storage address A in which the packet data that needs to be processed is stored in the coprocessor, where the header H of the packet data and the storage address A are sent by the coprocessor in step 32.

Step 34: The central processing unit processes a header H of packet data in the first packet data information to obtain an updated header, where it is assumed that the generated updated header of the packet data is H'. Other processing does not need to be performed on the storage address A in which the packet data that needs to be processed is stored in the coprocessor, and the storage address may be sent back to the coprocessor in the following step so that the coprocessor finds the residing second packet data P according to the address.

Step 35: The central processing unit sends processed first packet data information to the coprocessor through a PCIe link.

The processed first packet data information includes the updated header H' of the packet data and the storage address A in which the packet data that needs to be processed is stored in the coprocessor. Therefore, this step is as follows: The central processing unit sends, to the coprocessor, the new header H' of the packet data and the storage address A in which the packet data that needs to be processed is stored in the coprocessor.

Step 36: The coprocessor receives the processed first packet data information sent by the central processing unit, and generates finished packet data using the first packet data information processed by the central processing unit and the second packet data.

In actual application, this step includes: acquiring, by the coprocessor, the second packet data P using the storage address of the packet data that needs to be processed in the coprocessor; and associating (combining) the updated header H', processed by the central processing unit, of the packet data with the second packet data P to generate the finished packet data. Then, the coprocessor may send the finished packet data to a network interface, such as an Ethernet interface, for outputting.

Because the packet data that needs to be processed includes the second packet data, the storage address of the packet data that needs to be processed in the coprocessor is a storage address of the second packet data in the coprocessor. Therefore, it is implementable to acquire the second packet data using the storage address of the packet data that needs to be processed in the coprocessor.

Figure 4:
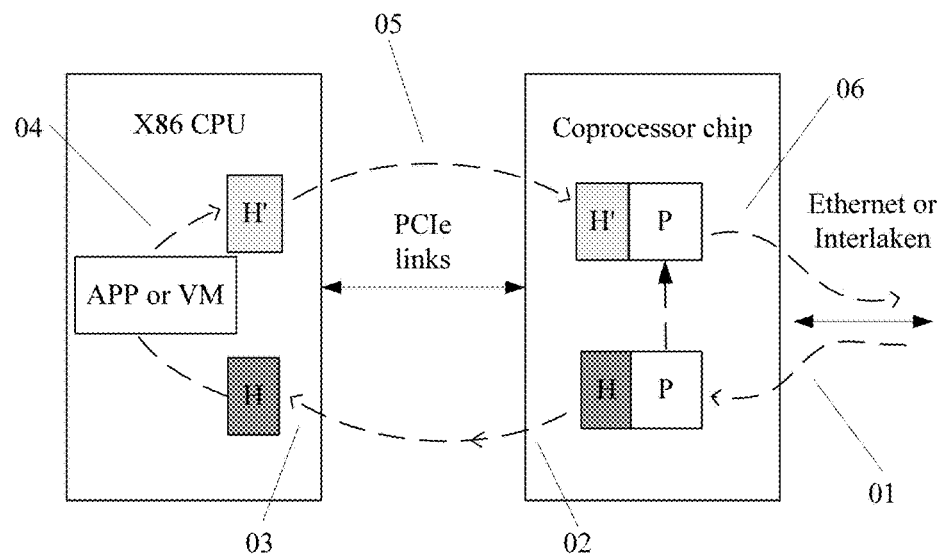
FIG. 4 is a schematic diagram of an application scenario of a packet data processing method according to Embodiment 3 of the present disclosure.
Figure 5:
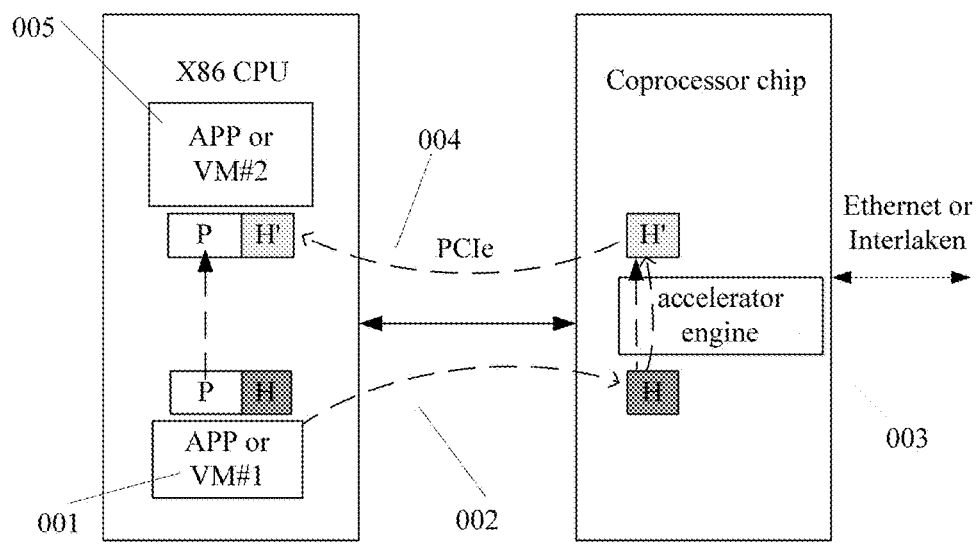
FIG. 5 is a schematic diagram of another application scenario of a packet data processing method according to Embodiment 3 of the present disclosure.

FIG. 4 is a schematic diagram of a packet data processing method according to Embodiment 3 of the present disclosure.

In FIGS. 4, 01 to 06 are respectively corresponding to steps 31 to 36. Step 04 in FIG. 4 is processing performed on packet data by an APP or a VM in a CPU.

Figure 6:
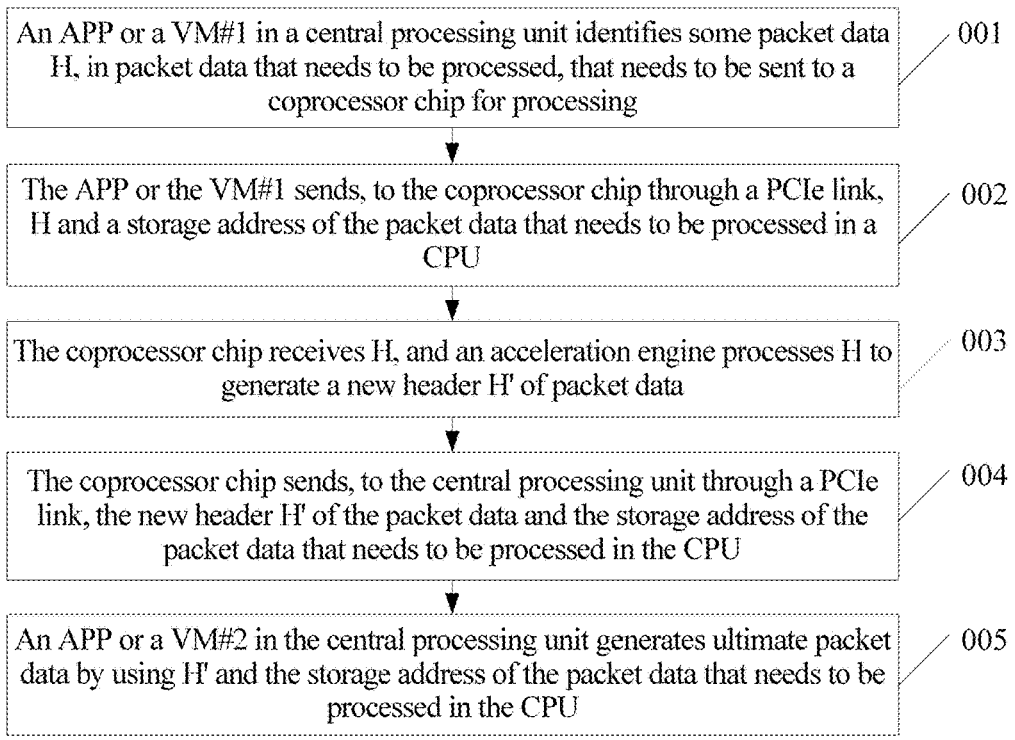
FIG. 6 is a flowchart of a packet data processing method in the application scenario in FIG. 5.

In specific application, two pieces of application APP software or two pieces of virtual machine VM software in an X86 CPU may implement packet communication using a PCIe interface. Packet data processed by these pieces of software may also be sent to a coprocessor for acceleration processing using an acceleration engine (accelerator engine). The following describes a process of processing packet data in this application scenario with reference to FIG. 5. In this case, as shown in FIG. 6, the process of processing packet data in this application scenario includes the following steps:

Step 001: An APP or a VM#1 in a central processing unit (an X86 CPU) identifies some packet data H, in packet data that needs to be processed, that needs to be sent to a coprocessor chip for processing. Other data, which is second data P, resides in the central processing unit.

Step 002: The APP or the VM#1 sends, to the coprocessor chip through a PCIe link, H and a storage address of the packet data that needs to be processed in the CPU.

Step 003: The coprocessor chip receives the H, and an acceleration engine processes H to generate a new header H' of the packet data.

Step 004: The coprocessor chip sends, to the central processing unit through the PCIe link, the new header H' of the packet data and the storage address of the packet data that needs to be processed in the CPU.

Step 005: The APP or a VM#2 in the central processing unit generates finished packet data using H' and the storage address of the packet data that needs to be processed in the CPU.

After receiving the storage address, sent by the coprocessor chip, of the packet data that needs to be processed in the CPU, the APP or the VM#2 in the central processing unit may acquire, using the storage address, the second packet data P residing in the APP or the VM#1. Afterwards, the new header H', sent by the coprocessor chip, of the packet data is combined with the second packet data P to generate complete packet data, and then, other processing may further be performed on the complete packet data.

It should be noted that, in actual application, data transmission may be performed multiple times between a first processing apparatus and a second processing apparatus. For example, in the application scenario in FIG. 5, after being processed in the APP or the VM#2, the packet data may further be sent to the coprocessor for processing. In this case, it should be noted that each time a header H of packet data is sent from the first processing apparatus (or the second processing apparatus) through a PCIe link, a storage address (that is, an address of the second packet data P) of this packet data needs to be sent at the same time so that the packet data P that is not sent and resides in the first processing apparatus (or the second processing apparatus) is found using the address, and that a new header H', processed by the second processing apparatus (or the first processing apparatus), of the packet data is combined with P to generate finished complete packet data. In addition, a header H of packet data may be sent to the second processing apparatus multiple times and processed multiple times. For a header H of the packet data to be processed, a storage address of the header H in the multiple times in the first processing apparatus may be different; therefore, it is necessary to send the header H of the packet data along with the storage address of the H. For example, when packet data is sent for the first time, a storage address of a header H of the packet data is A; a received new header H' of the packet data is combined with P to generate finished packet data, and the new packet data is stored in a storage address B in the first processing apparatus. If the new packet data needs to be sent to the second processing apparatus again, the header H' of the packet data and the storage address B need to be sent. Likewise, for a case in which packet data is sent multiple times, a possible storage location of packet data generated by combining a header H', updated by the second processing apparatus, of the packet data with P is different.

It may be learned from the above that, according to the packet data processing method provided in Embodiment 3 of the present disclosure, when packet data is being processed, only first packet data information in a first processing apparatus is sent to a second processing apparatus for processing; that is, only some necessary data is sent to the second processing apparatus for processing, and data that does not need to be processed may be stored in the first processing apparatus. The data stored in the first processing apparatus does not need to be transmitted through a PCIe link, which helps alleviate a burden of the PCIe link. Therefore, compared with the prior art, the packet data processing method provided in Embodiment 3 of the present disclosure can improve packet data transmission efficiency.

Figure 7:
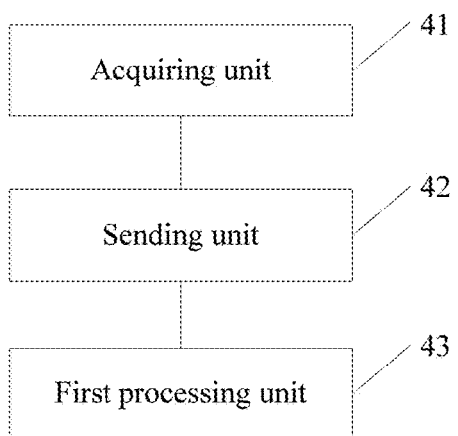
FIG. 7 is a structural diagram of a packet data processing apparatus according to Embodiment 4 of the present disclosure.

As shown in FIG. 7, Embodiment 4 of the present disclosure provides a packet data processing apparatus, where the packet data processing apparatus is located in a first processing apparatus, and includes: an acquiring unit 41 configured to acquire packet data that needs to be processed, where the packet data that needs to be processed includes first packet data information and second packet data, and the first packet data information includes a header of the packet data that needs to be processed and a storage address of the packet data that needs to be processed in the first processing apparatus; a sending unit 42 configured to send the first packet data information acquired by the acquiring unit 41 to a second processing apparatus so that the second processing apparatus processes the first packet data information; and a first processing unit 43 configured to: receive first packet data information processed by the second processing apparatus, and generate finished packet data using the first packet data information processed by the second processing apparatus and the second packet data indicated by the storage address, where the first packet data information processed by the second processing apparatus includes an updated header processed by the second processing apparatus and the storage address.

The first processing apparatus communicates with the second processing apparatus using Peripheral Component Interconnect Express.

Figure 8:
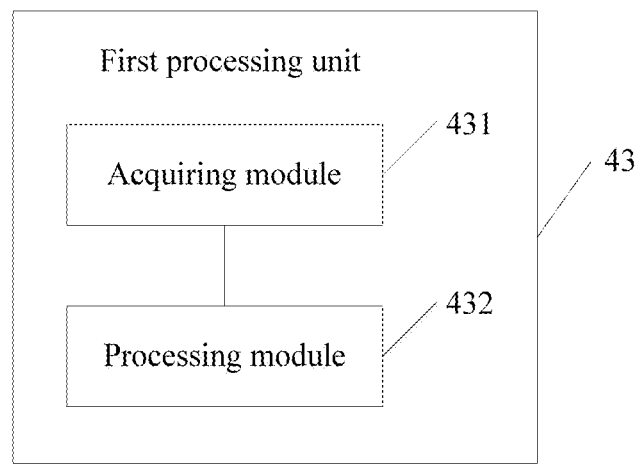
FIG. 8 is a schematic diagram of a packet data processing apparatus according to Embodiment 4 of the present disclosure.

As shown in FIG. 8, the first processing unit 43 includes: an acquiring module 431 configured to acquire the second packet data using the storage address; and a processing module 432 configured to associate the updated header with the second packet data acquired by the acquiring module 431 to generate the finished packet data.

In actual application, the first processing apparatus may be a central processing unit, and the second processing apparatus is a coprocessor; or the first processing apparatus is a coprocessor, and the second processing apparatus is a central processing unit.

For operating principles of the apparatus, reference may be made to the description in the foregoing method embodiment 1, and details are not described herein again.

It may be learned from the above that, according to the packet data processing apparatus in Embodiment 4 of the present disclosure, when packet data is being processed, a first processing apparatus sends only some necessary data to a second processing apparatus for processing; that is, only some necessary data is sent to the second processing apparatus for processing, and data that does not need to be processed may be stored in the first processing apparatus. The data stored in the first processing apparatus does not need to be transmitted through a PCIe link, which helps alleviate a burden of the PCIe link. Therefore, compared with the prior art, the packet data processing apparatus provided in Embodiment 4 of the present disclosure can improve packet data transmission efficiency.

Figure 9:
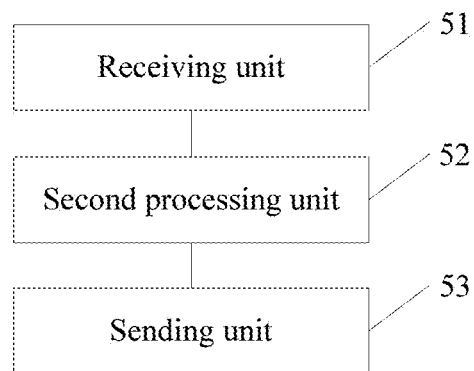
FIG. 9 is a structural diagram of a packet data processing apparatus according to Embodiment 5 of the present disclosure.

As shown in FIG. 9, Embodiment 5 of the present disclosure provides a packet data processing apparatus, where the packet data processing apparatus is located in a second processing apparatus, and includes: a receiving unit 51 configured to receive first packet data information, sent by a first processing apparatus, in packet data that needs to be processed, where the first packet data information includes a header of the packet data that needs to be processed and a storage address of the packet data that needs to be processed in the first processing apparatus; a second processing unit 52 configured to process the header, received by the receiving unit 51, of the packet data that needs to be processed to obtain an updated header; and a sending unit 53 configured to send first packet data information processed by the second processing unit 52 to the first processing apparatus so that the first processing apparatus generates finished packet data according to the processed first packet data information and second packet data in the packet data that needs to be processed, where the processed first packet data information includes the updated header and the storage address.

The first processing apparatus communicates with the second processing apparatus using Peripheral Component Interconnect Express.

The first processing apparatus is a central processing unit, and the second processing apparatus is a coprocessor; or the first processing apparatus is a coprocessor, and the second processing apparatus is a central processing unit.

For operating principles of the apparatus, reference may be made to the description in the foregoing method embodiment 2, and details are not described herein again.

It may be learned from the above that, according to the packet data processing apparatus in Embodiment 5 of the present disclosure, when processing packet data, a second processing apparatus receives only some necessary packet data that is sent by a first processing apparatus through a PCIe link, and data that does not need to be processed may be stored in the first processing apparatus. The data stored in the first processing apparatus does not need to be transmitted through the PCIe link, which helps alleviate a burden of the PCIe link. Therefore, compared with the prior art, the packet data processing method provided in Embodiment 2 of the present disclosure can improve packet data transmission efficiency.

Embodiment 6 of the present disclosure provides a packet data processing system, where the packet data processing system includes a first processing apparatus and a second processing apparatus.

The first processing apparatus is configured to: acquire packet data that needs to be processed, where the packet data that needs to be processed includes first packet data information and second packet data, and the first packet data information includes a header of the packet data that needs to be processed and a storage address of the packet data that needs to be processed in the first processing apparatus; and send the first packet data information to the second processing apparatus.

The second processing apparatus is configured to: receive the first packet data information sent by the first processing apparatus; process the header of the packet data that needs to be processed to obtain an updated header; and send processed first packet data information to the first processing apparatus so that the first processing apparatus generates finished packet data according to the processed first packet data information and the second packet data in the packet data that needs to be processed, where the processed first packet data information includes the updated header and the storage address.

It may be learned from the above that, according to the packet data processing system provided in Embodiment 6 of the present disclosure, only some necessary data is sent or received through a PCIe link, which can overcome a defect of low packet data transmission efficiency caused by sending or receiving entire data through a PCIe link in the prior art, thereby improving the transmission efficiency of the packet data.

Figure 10:
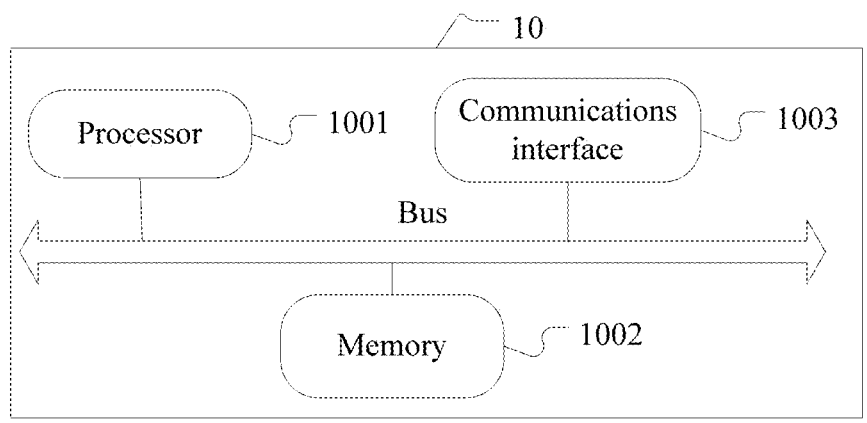
FIG. 10 is a schematic structural diagram of a packet data processing device according to Embodiment 7 of the present disclosure.

FIG. 10 is a schematic structural diagram of a packet data processing device according to Embodiment 7 of the present disclosure. As shown in FIG. 10, a remote control device 10 in this embodiment includes: at least one processor 1001, a memory 1002, a communications interface 1003, and a bus. The processor 1001, the memory 1002, and the communications interface 1003 are connected to each other and communicate with each other using the bus. The bus may be an Industry Standard Architecture (ISA) bus, a peripheral component interconnect (PCI) bus, an Extended Industry Standard Architecture (EISA) bus, or the like. The bus may be an address bus, a data bus, a control bus, or the like. For convenience of denotation, the bus is represented using only one thick line in FIG. 10; however, it does not indicate that there is only one bus or only one type of bus, where:

The memory 1002 is configured to store executable program code, where the program code includes a computer operation instruction. The memory 1002 may include a high-speed random access memory (RAM) memory, and may further include a non-volatile memory, such as at least one disk memory.

In an embodiment, the processor 1001 runs a program corresponding to the executable program code by reading the executable program code stored in the memory 1002 so as to: acquire packet data that needs to be processed, where the packet data that needs to be processed includes first packet data information and second packet data, and the first packet data information includes a header of the packet data that needs to be processed and a storage address of the packet data that needs to be processed in the first processing apparatus; send the first packet data information to a second processing apparatus so that the second processing apparatus processes the first packet data information; and receive first packet data information processed by the second processing apparatus, and generate finished packet data using the first packet data information processed by the second processing apparatus and the second packet data indicated by the storage address, where the first packet data information processed by the second processing apparatus includes an updated header processed by the second processing apparatus and the storage address.

In another embodiment, the processor 1001 runs a program corresponding to the executable program code by reading the executable program code stored in the memory 1002 so as to: receive first packet data information, sent by a first processing apparatus, in packet data that needs to be processed, where the first packet data information includes a header of the packet data that needs to be processed and a storage address of the packet data that needs to be processed in the first processing apparatus; process the header of the packet data that needs to be processed to obtain an updated header; and send processed first packet data information to the first processing apparatus so that the first processing apparatus generates finished packet data according to the processed first packet data information and second packet data in the packet data that needs to be processed, where the processed first packet data information includes the updated header and the storage address.

The processor 1001 may be a central processing unit, or an application-specific integrated circuit (ASIC), or one or more integrated circuits configured to implement this embodiment of the present disclosure.

It should be noted that the foregoing processor 1001, in addition to having the functions described above, may be further configured to implement other procedures in the foregoing method embodiments, and details are not described herein again.

The communications interface 1003 is mainly configured to implement communication between a traffic source determining device in this embodiment and another device or apparatus.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a RAM.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet data processing method executed by a first processing apparatus, the method comprising:
    acquiring, by the first processing apparatus, first packet data that needs to be processed, the first packet data that needs to be processed comprising first packet data information and second packet data stored at a first storage address in the first processing apparatus, and the first packet data information comprising a header of the first packet data and the first storage address of the second packet data;
    sending, by the first processing apparatus to a second processing apparatus, the first packet data information including the first storage address in the first processing apparatus at which the second packet data is stored;
    receiving, by the first processing apparatus from the second processing apparatus, first updated packet data information that comprises a first updated header and the first storage address in the first processing apparatus at which the second packet data is stored;
    subsequent to receiving the first updated packet data information from the second processing apparatus, acquiring, by the first processing apparatus, the second packet data using the first storage address;
    processing, by the first processing apparatus, the first updated packet data information and the second packet data to generate first finished packet data by associating the first updated header with the second packet data;
    storing the first finished packet data in a second storage address in the first processing apparatus;
    acquiring, by the first processing apparatus, the first finished packet data from the second storage address in the first processing apparatus at which the first finished packet data is stored;
    sending, by the first processing apparatus to the second processing apparatus, the first updated header and the second storage address in the first processing apparatus at which the first finished packet data is stored;
    receiving, by the first processing apparatus from the second processing apparatus, second updated packet data information that comprises a second updated header and the second storage address in the first processing apparatus at which the first finished packet data is stored;
    subsequent to receiving the second updated packet data information from the second processing apparatus, acquiring, by the first processing apparatus, the second packet data using the second storage address at which the first finished packet data is stored; and
    processing, by the first processing apparatus, the second updated packet data information and the second packet data to generate second finished packet data by associating the second updated header with the second packet data.

2. The packet data processing method of claim 1, wherein the first processing apparatus communicates with the second processing apparatus using Peripheral Component Interconnect Express.

3. The packet data processing method of claim 1, wherein the first processing apparatus is a central processing unit and the second processing apparatus is a coprocessor.

4. The packet data processing method of claim 1, wherein the first processing apparatus is a coprocessor and the second processing apparatus is a central processing unit.

5. The method of claim 1, wherein the first processing apparatus is an x86 central processing unit and the second processing apparatus is a network interface card.

6. The method of claim 1, wherein the first storage address is different than the second storage address.

7. A packet data processing method, comprising:
    identifying, by a first virtual machine in a central processing unit (CPU), first packet data information in first packet data that needs to be processed, the first packet data information including a header of the first packet data and a first storage address in the first virtual machine at which second packet data of the first packet data is stored;
    sending, by the first virtual machine to a coprocessor chip, the first packet data information including the first storage address in the first virtual machine at which the second packet data of the first packet data is stored;
    receiving, by the coprocessor chip from the first virtual machine, the first packet data information;
    processing, by the coprocessor chip, the header of the first packet data to obtain a first updated header;
    sending, by the coprocessor chip to a second virtual machine in the CPU, first updated packet data information that includes the first updated header and the first storage address in the first virtual machine at which the second packet data is stored;
    receiving, by the second virtual machine from the coprocessor chip, the first updated packet data information including the first storage address in the first virtual machine at which the second packet data is stored;
    subsequent to the second virtual machine receiving the first updated packet data information from the coprocessor chip, acquiring, by the second virtual machine, the second packet data using the first storage address;
    processing, by the second virtual machine, the first updated packet data information and the second packet data to generate first finished packet data by associating the first updated header with the second packet data;
    storing the first finished packet data in a second storage address in the first virtual machine;
    acquiring, by the first virtual machine, the first finished packet data from the second storage address in the first virtual machine at which the first finished packet data is stored;
    sending, by the first virtual machine to the coprocessor chip, the first updated header and the second storage address in the first virtual machine at which the first finished packet data is stored;
    receiving, by the second virtual machine from the coprocessor chip, second updated packet data information that comprises a second updated header and the second storage address in the first virtual machine at which the first finished packet data is stored;
    subsequent to receiving the second updated packet data information from the coprocessor chip, acquiring, by the second virtual machine, the second packet data using the second storage address at which the first finished packet data is stored; and processing, by the second virtual machine, the second updated packet data information and the second packet data to generate second finished packet data by associating the second updated header with the second packet data.

8. The packet data processing method of claim 7, wherein the CPU communicates with the coprocessor chip using Peripheral Component Interconnect Express.

9. A packet data processing apparatus, the packet data processing apparatus being located in a first processing apparatus, and the packet data processing apparatus comprising:
- a first processor configured to acquire first packet data that needs to be processed, the first packet data comprising first packet data information and second packet data stored at a first storage address in the first processing apparatus, and the first packet data information comprising a header of the first packet data and the first storage address of the second packet data;
- a transmitter coupled to the first processor and configured to send to a second processing apparatus the first packet data information including the first storage address in the first processing apparatus at which the second packet data is stored; and
- a second processor coupled to the first processor and configured to:
  - receive, from the second processing apparatus, first updated packet data information that comprises a first updated header and the first storage address in the first processing apparatus at which the second packet data is stored;
  - subsequent to receiving the first updated packet data information from the second processing apparatus, acquire the second packet data using the first storage address;
  - process the first updated packet data information and the second packet data to generate first finished packet data by associating the first updated header with the second packet data,
- the first processor being further configured to:
  - store the first finished packet data in a second storage address in the first processing apparatus;
  - acquire the first finished packet data from the second storage address; and
  - send the first updated header and the second storage address to the second processing apparatus, and
- the second processor being further configured to:
  - receive, from the second processing apparatus, second updated packet data information that comprises a second updated header and the second storage address;
  - subsequent to receiving the second updated packet data information from the second processing apparatus, acquire the second packet data using the second storage address; and
  - process the second updated packet data information and the second packet data to generate second finished packet data by associating the second updated header with the second packet data.

10. The packet data processing apparatus of claim 9, wherein the first processing apparatus communicates with the second processing apparatus using Peripheral Component Interconnect Express.

11. The packet data processing apparatus of claim 9, wherein the first processing apparatus is a central processing unit and the second processing apparatus is a coprocessor.

12. The packet data processing apparatus of claim 9, wherein the first processing apparatus is a coprocessor and the second processing apparatus is a central processing unit.

13. A packet data processing apparatus located in a second processing apparatus, the packet data processing apparatus comprising:
- a receiver configured to receive, from a first processing apparatus, first packet data information of first packet data that needs to be processed, the first packet data information comprising a header of the first packet data and a first storage address in the first processing apparatus at which second packet data of the first packet data is stored;
- a processor coupled to the receiver and configured to process the header of the first packet data to obtain a first updated header;
- a transmitter coupled to the processor and configured to send to the first processing apparatus the first updated header and the first storage address to cause the first processing apparatus to acquire the second packet data from the first storage address and to process the first updated header and the second packet data;
- the receiver further configured to receive, from the first processing apparatus, the first updated header and a second storage address in the first processing apparatus at which the second packet data and the first updated header are stored;
- the processor further configured to process the first updated header to generate second updated packet data information that comprises a second updated header and the second storage address; and
- the transmitter further configured to transmit the second updated packet data information to the first processing apparatus to cause the first processing apparatus to acquire the second packet data from the second storage address and to process the first updated header and the second packet data.

14. The packet data processing apparatus of claim 13, wherein the first processing apparatus communicates with the second processing apparatus using Peripheral Component Interconnect Express.

15. The packet data processing apparatus of claim 13, wherein the first processing apparatus is a central processing unit and the second processing apparatus is a coprocessor.

16. The packet data processing apparatus of claim 13, wherein the first processing apparatus is a coprocessor, and the second processing apparatus is a central processing unit.

17. A packet data processing system, comprising:
- a second processing apparatus; and
- a first processing apparatus coupled to the second processing apparatus and configured to:
  - acquire first packet data that needs to be processed, the first packet data comprising first packet data information and second packet data stored at a first storage address in the first processing apparatus, and the first packet data information comprising a header of the first packet data and the first storage address of the second packet data; and
  - send to the second processing apparatus the first packet data information including the first storage address in the first processing apparatus at which the second packet data is stored, the second processing apparatus being configured to:
   receive the first packet data information sent by the first processing apparatus;
   process the header of the first packet data to obtain a first updated header; and
   send to the first processing apparatus the first updated header and the first storage address in the first processing apparatus at which the second packet data is stored, the first processing apparatus being further configured to:
   receive from the second processing apparatus the first updated header and the first storage address in the first processing apparatus at which the second packet data is stored;
   acquire the second packet data using the first storage address;
   process the first updated header and the second packet data to generate first finished packet data by associating the first updated header with the second packet data;
   store the first finished packet data in a second storage address in the first processing apparatus;
   acquire the first finished packet data from the second storage address;
   send the first updated header and the second storage address to the second processing apparatus;
   receive, from the second processing apparatus, second updated packet data information that comprises a second updated header and the second storage address;
   subsequent to receiving the second updated packet data information from the second processing apparatus, acquire the second packet data using the second storage address; and
   process the second updated packet data information and the second packet data to generate second finished packet data by associating the second updated header with the second packet data.

\* \* \* \* \*